H. R. SCHNARR & M. WOLF.
BOW FOR VEHICLE TOPS.
APPLICATION FILED APR. 1, 1912.

1,053,230. Patented Feb. 18, 1913.

Witnesses
H. G. Batchelor
S. J. Lehrer

Inventors
Henry R. Schnarr.
Max Wolf.
By
Attorneys.

UNITED STATES PATENT OFFICE.

HENRY R. SCHNARR AND MAX WOLF, OF CHICAGO, ILLINOIS; SAID WOLF ASSIGNOR TO SAID SCHNARR.

BOW FOR VEHICLE-TOPS.

1,053,230. Specification of Letters Patent. Patented Feb. 18, 1913.

Application filed April 1, 1912. Serial No. 687,852.

*To all whom it may concern:*

Be it known that we, HENRY R. SCHNARR, a citizen of the United States, and MAX WOLF, a subject of the Emperor of Germany, residing at Chicago, in the county of Cook and State of Illinois, have invented certain new and useful Improvements in Bows for Vehicle-Tops, of which the following is a specification.

This invention relates to the bows of vehicle tops and its object is to provide a novel and improved reinforcement for the bow whereby the latter is strengthened and prevented from warping.

Figure 1:
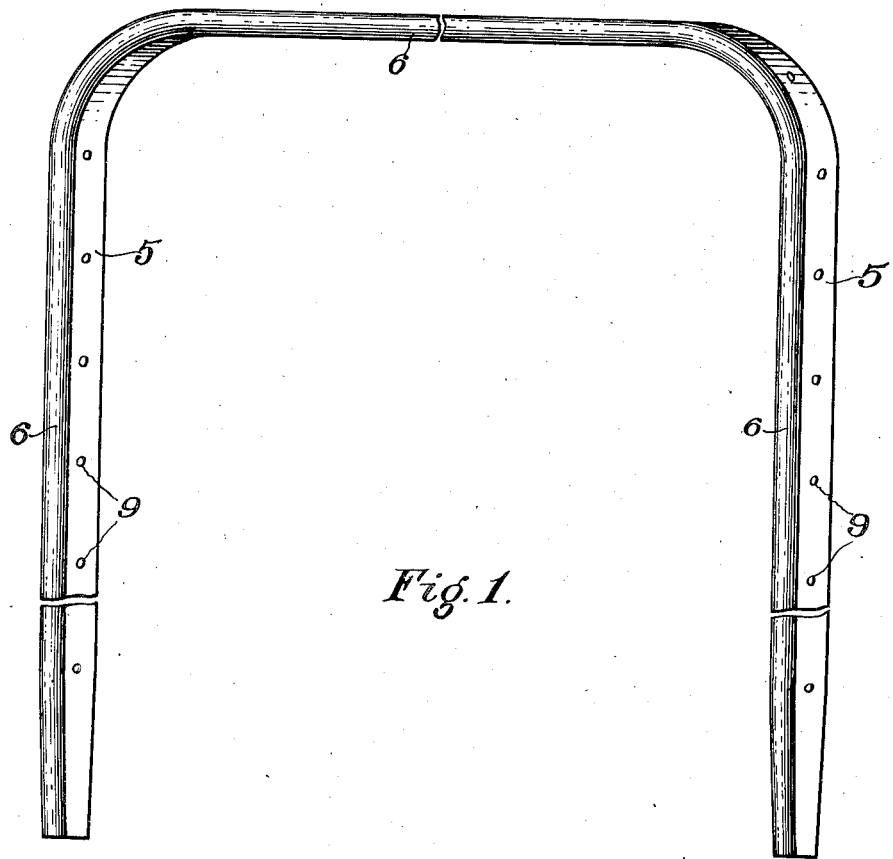
Figure 2:
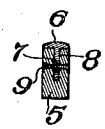

In the accompanying drawing, Figure 1 is a perspective view of a bow constructed in accordance with the present invention, and Fig. 2 is a cross-section thereof.

Referring specifically to the drawing, the bow 5 is made of wood which is bent into the required shape. The reinforcement is a rigid metal strip of T-shaped cross-section which is applied to the outer surface of the bow, the head 6 of the strip fitting on said surface and completely covering the same, and the web or flange 7 of the strip seating in a slot 8 made in the bow. The strip is secured in place by rivets 9 passing transversely through the bow and the web 7, as clearly shown in Fig. 2. The strip is shaped to conform to the curvature of the bow and extends continuously from one end thereof to the other.

The strip herein described provides a simple and efficient reinforcement for the bow and effectually prevents warping thereof, as well as breakage from shocks.

We claim:

1. The combination with a vehicle bow, of a continuous rigid reinforcing member applied thereto and extending from one end thereof to the other, said member being T-shaped in cross-section, the head thereof fitting on the outside of the bow and the web of the member being embedded in the bow.

2. The combination with a vehicle bow, of a continuous rigid reinforcing member applied thereto and extending from one end thereof to the other, said member being T-shaped in cross-section, the head thereof fitting on the outside of the bow and the web of the member being embedded in the bow, and fastening means passing transversely through the bow and the web.

3. The combination with a vehicle bow, of a continuous rigid reinforcing member applied thereto and extending from one end thereof to the other, said member being T-shaped in cross-section, the head thereof fitting one side of the bow and completely covering the same, and the web of the member being embedded in the bow and secured therein.

In testimony whereof we affix our signatures in presence of two witnesses.

HENRY R. SCHNARR.
MAX WOLF.

Witnesses:
S. J. LEHRER,
H. G. BATCHELOR.